(12) United States Patent
Obermark et al.

(10) Patent No.: US 11,919,485 B1
(45) Date of Patent: Mar. 5, 2024

(54) ANGULARLY ADJUSTABLE OBJECT SUPPORT RACK FOR A VEHICLE

(71) Applicant: Etrailer Corporation

(72) Inventors: Craig Obermark, Union, MO (US); Daniel Perotti, St. Peters, MO (US); Brenden McIntyre, Winfield, MO (US)

(73) Assignee: ETRAILER CORPORATION, Wentzville, MO (US)

( * ) Notice: Subject to any disclaimer, the term of this patent is extended or adjusted under 35 U.S.C. 154(b) by 0 days.

(21) Appl. No.: 17/883,763

(22) Filed: Aug. 9, 2022

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/06; B60R 9/10
USPC ......................................................... 224/499
See application file for complete search history.

(56) References Cited

U.S. PATENT DOCUMENTS

| | | | | |
|---|---|---|---|---|
| 4,400,129 A * | 8/1983 | Eisenberg | ................. | B60R 9/06 224/532 |
| 5,685,469 A * | 11/1997 | Stapleton | ................. | B60R 9/10 224/536 |
| 6,062,451 A * | 5/2000 | Lassanske | ................. | B60R 9/06 224/504 |
| 6,129,371 A * | 10/2000 | Powell | ..................... | B60R 9/06 280/491.5 |
| 6,401,999 B1 * | 6/2002 | Hehr | ......................... | B60R 9/06 224/508 |
| 6,485,243 B1 * | 11/2002 | Ferman | ..................... | B60R 9/06 224/520 |
| 7,410,082 B2 * | 8/2008 | Stewart | ..................... | B60R 9/10 224/512 |
| 7,784,656 B2 * | 8/2010 | Morrill | ..................... | B60R 9/10 224/512 |
| 11,518,317 B2 * | 12/2022 | Oshman | .................... | B60R 9/06 |
| 11,628,777 B2 * | 4/2023 | Huang | ...................... | B60R 9/06 224/569 |
| 2005/0035168 A1 * | 2/2005 | Prescott | .................... | B60R 9/10 224/924 |
| 2008/0099522 A1 * | 5/2008 | Clausen | .................... | B60R 9/06 224/519 |
| 2010/0050794 A1 * | 3/2010 | Chiang | ..................... | B60R 9/10 74/70 |

(Continued)

*Primary Examiner* — Peter N Helvey
(74) *Attorney, Agent, or Firm* — Sandberg Phoenix & von Gontard PC

(57) ABSTRACT

And angularly adjustable object support rack or bicycle support rack for a vehicle is constructed with a first rod and a second rod connected by an adjustment structure that enables the first rod and the second rod to be adjusted to a folded over configuration that occupies less space when storing the bicycle rack. The adjustment structure also enables the first rod and second rod to be adjusted to a right angle orientation that reduces the extent the support rack extends from the rear of a vehicle to which it is attached. The adjustment structure enables the first rod and second rod to be adjusted to where the second rod is aligned with the first rod for attaching bicycles on the support rack. The adjustment structure further enables the second rod to be adjusted to a downward tilted orientation providing clearance between the vehicle and the attached support rack.

18 Claims, 6 Drawing Sheets

(56) References Cited

U.S. PATENT DOCUMENTS

| | | | | |
|---|---|---|---|---|
| 2014/0246467 | A1* | 9/2014 | Hein | B60R 9/06 |
| | | | | 224/400 |
| 2016/0068110 | A1* | 3/2016 | Prescott | B60R 9/10 |
| | | | | 224/539 |
| 2016/0200157 | A1* | 7/2016 | Marmon | B60D 1/58 |
| | | | | 280/491.3 |
| 2017/0349111 | A1* | 12/2017 | Ramsdell | B60R 9/06 |
| 2019/0161022 | A1* | 5/2019 | McFadden | B60R 9/10 |
| 2020/0406830 | A1* | 12/2020 | Owen | B62H 3/12 |
| 2021/0009223 | A1* | 1/2021 | Tsai | B62H 3/00 |
| 2023/0242045 | A1* | 8/2023 | Weng | B60R 9/06 |
| | | | | 224/533 |

* cited by examiner

ANGULARLY ADJUSTABLE OBJECT SUPPORT RACK FOR A VEHICLE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

An object support rack, for example a bicycle support rack is often used to transport one or more bicycles on a vehicle. The typical bicycle support rack is removably attachable to a trailer hitch receiver tube at the back of the vehicle. Although the bicycle support rack makes transporting one or more bicycles on the vehicle convenient, there are some disadvantages associated with the construction of a typical bicycle support rack.

For example, when the bicycle support rack is attached to the trailer hitch receiver at the back of the vehicle, the support rack extends rearwardly from the vehicle. The extent to which the support rack extends from the vehicle usually depends on the number of bicycles the support rack is designed to support. When the support rack is not supporting bicycles, it is less noticeable. The support rack extending rearwardly from the vehicle could go unnoticed by a person walking by the back of the vehicle and the person could accidentally walk into the support rack and become injured.

The ability to attach the bicycle support rack to a trailer hitch receiver on a vehicle enables the bicycle support rack to be easily removed from the vehicle when not in use. However, the ability to easily remove the support rack when not in use creates the problem of storing the support rack when removed from the vehicle. A typical bicycle support rack is relatively large and cumbersome and takes up a good amount of storage space when removed from the vehicle and stored.

When in use, the bicycle support rack supports the bicycle or bicycles directly behind the rear of the vehicle. This position of the bicycles on the rack may obstruct access to the trunk, rear hatch or tailgate of the vehicle.

BRIEF SUMMARY

The angularly adjustable object support rack or bicycle support rack of this disclosure has a unique construction that overcomes the above-described disadvantages. The construction enables the support rack to be moved or folded to a right angle configuration when the support rack is mounted on a vehicle but is not supporting bicycles. The right angle configuration of the support rack reduces the extent to which the support rack extends rearwardly from the vehicle and reduces the potential for a person walking by the back of the vehicle not noticing the support rack and accidentally walking into the support rack.

Additionally, the construction of the support rack enables the support rack to be removed from the vehicle and moved to a folded over configuration when not in use. The folded over configuration of the support rack reduces the overall size of the support rack and makes storage of the support rack removed from the vehicle more convenient.

Still further, the construction of the support rack enables a rearward portion of the support rack to be moved downwardly when supporting a bicycle or bicycles. The downward tilting movement of the rearward portion of the support rack moves the bicycles supported on the rearward portion away from the rear of the vehicle to which the support rack is attached. This provides sufficient clearance to access and open the trunk, rear hatch or tailgate of the vehicle without removing the support rack from the vehicle or removing bicycles from the support rack.

The unique construction of the object support rack or bicycle support rack of this disclosure includes a first rod having a length between a forward end and an opposite rearward end of the first rod. The length of the first rod from the forward end to the rearward end defines a rearward direction relative to the support rack. The length of the first rod from the rearward end to the forward end defines a forward direction relative to the support rack. The forward end of the first rod is configured for attachment to a vehicle, and more specifically to a trailer hitch receiver on the vehicle. The attachment of the forward end of the first rod to the vehicle removably attaches the support rack to the vehicle.

An adjustment mechanism or structure is attached to the rearward end of the first rod. The structure extends upward from the rearward end of the first rod. The construction of the structure enables the angular adjustment of the support rack.

A groove is formed in the structure. The groove has an arcuate configuration and has a plurality of edge surfaces at spaced positions along the groove. The plurality of edge surfaces forms a plurality of stops on the structure. The stops are spatially arranged on the structure at a plurality of positions of the stops on the structure.

The construction of the support rack includes a second rod. The second rod has a length between a forward end of the second rod and an opposite rearward end of the second rod.

There is a connection on the forward end of the second rod. The connection attaches the forward end of the second rod to the adjustment mechanism or structure for movement of the second rod on the structure and relative to the first rod. The second rod is movable between the plurality of positions of the plurality of stops on the structure.

A detent constructed as a pin extends from a side of the second rod. The pin is configured for engaging each stop at each position of the plurality of positions of the plurality of stops on the structure and retaining the second rod at each position. A spring on the second rod biases the pin into engagement with each stop of the plurality of stops formed by the plurality of edge surfaces on the structure.

The plurality of stops includes a first stop that is engaged by the pin on the second rod and stops movement of the second rod on the structure and relative to the first rod. The first stop stops movement of the second rod at a folded over configuration of the first rod and second rod with the second rod positioned extending over the first rod. This folded over configuration of the second rod over the first rod reduces the area occupied by the support rack and makes it convenient to store the adjustable bicycle support rack when the support rack is removed from the vehicle.

The plurality of stops includes a second stop that is engaged by the pin and stops movement of the second rod on the structure and relative to the first rod. The second stop stops movement of the second rod with the second rod positioned extending in a right angle orientation relative to the first rod. This right angle orientation of the second rod on the first rod reduces the extent to which the adjustable bicycle support rack extends from the back of a vehicle when the support rack is attached to the vehicle and is not being used to support bicycles.

The plurality of stops include a third stop that is engaged by the pin and stops movement of the second rod on the structure and relative to the first rod. The third stop stops movement of the second rod with the second rod positioned aligned with the first rod and extending in the rearward direction from the rearward end of the first rod. In this relative positioning of the first rod and second rod the adjustable bicycle support rack is used in attaching and supporting one or more bicycles on the support rack.

The plurality of stops includes a fourth stop that is engaged by the pin and stops movement of the second rod on the structure and relative to the first rod. The fourth stop stops movement of the second rod with the second rod positioned extending in the rearward direction from the rearward end of the first rod and extending downward from the rearward end of the first rod. The downward tilting movement of the second rod moves the bicycles supported on the second rod away from the rear of the vehicle to which the support rack is attached. This provides sufficient clearance to access and open the trunk, rear hatch or tailgate of the vehicle without removing the support rack from the vehicle or removing the bicycles from the support rack.

There is an actuator on the second rod that is operatively connected with the pin. Manual manipulation of the actuator moves the pin and disengages the pin from engagement with each engaged edge surface or stop on the structure.

There is at least one object support or bicycle support on the second rod, and preferably more than one bicycle support on the second rod. At least one of the bicycle supports is positioned on the second rod forward of the connection of the second rod to the adjustment mechanism or structure where the weight of a bicycle supported on the bicycle support counter acts the weight of a bicycle on a bicycle support positioned rearward of the connection. This distribution of the weight of the two bicycles on the opposite sides of the connection makes it easier to move the second rod relative to the first rod and lift the bicycle positioned rearward of the connection off the second rod of the support rack.

The features, functions, and advantages of the adjustable object support rack apparatus that have been discussed can be achieved independently in various embodiments or may be combined in yet other embodiments further details of which can be seen with reference to the following description and drawings.

BRIEF DESCRIPTION OF THE DRAWINGS

Corresponding reference numerals will be used throughout the several figures of the drawings.

DETAILED DESCRIPTION

Figure 1:
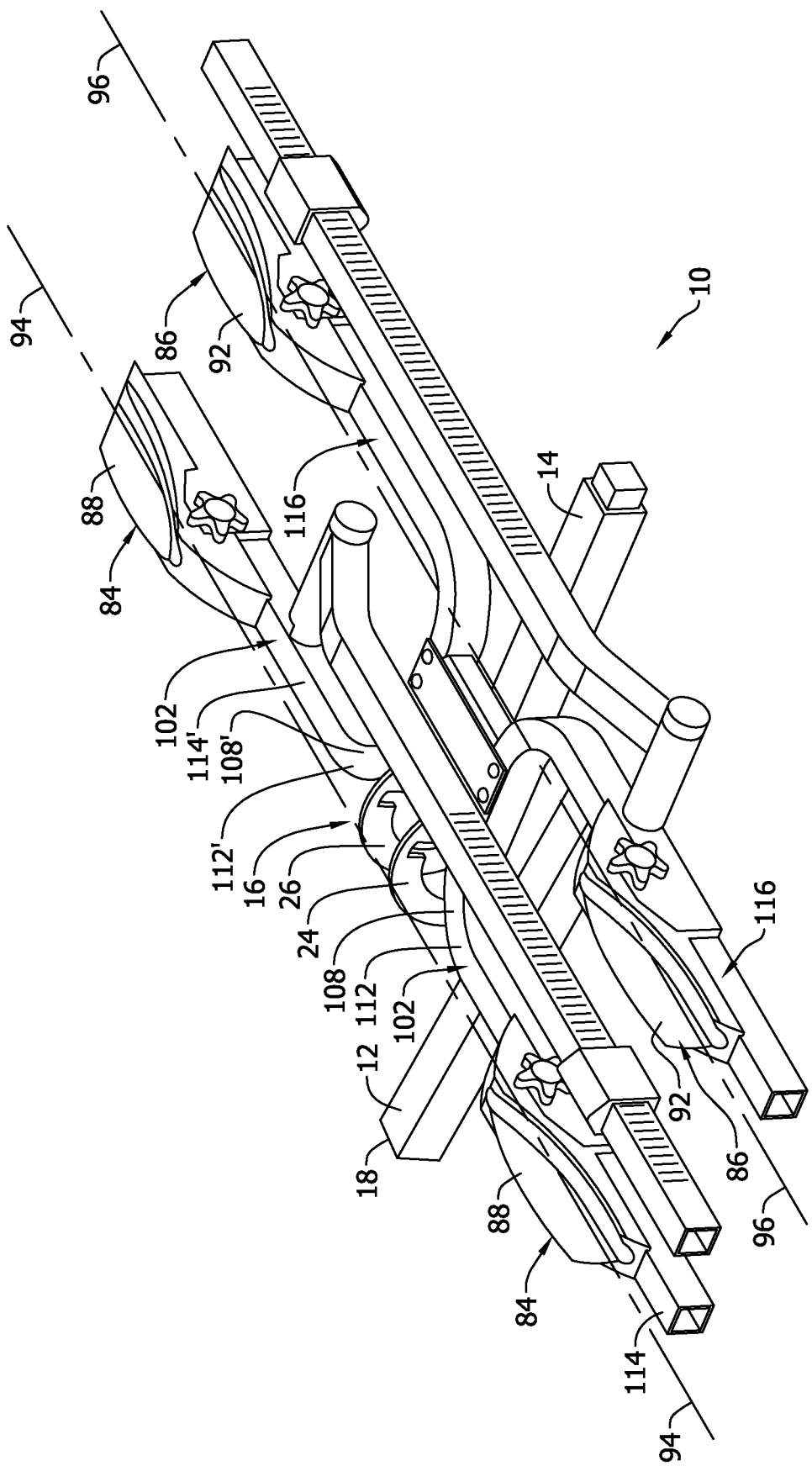
FIG. 1 is a representation of a top, perspective view of the angularly adjustable object support rack for a vehicle from a rearward end of the support rack.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 2:
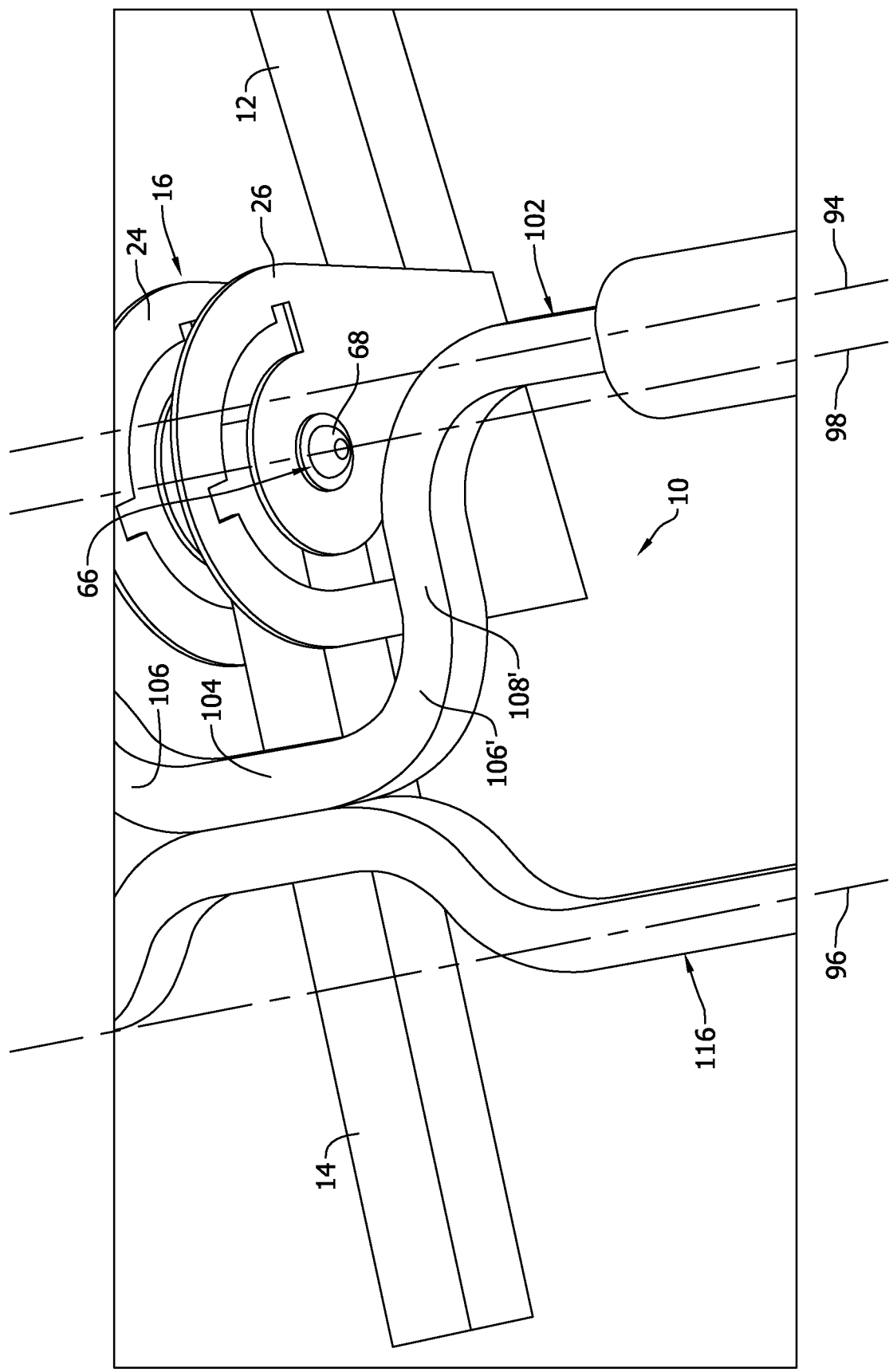
FIG. 2 is a representation of a top, perspective view of the support rack from the opposite side of the support rack represented in FIG. 1.

FIG. 1 is a representation of a top, perspective view of the angularly adjustable object support rack for a vehicle 10 of this disclosure. In the orientation of the support rack 10 represented in FIG. 1, a rearward end of the support rack 10 is shown to the right in FIG. 1 and a forward end of the support rack is shown to the left in FIG. 1. FIG. 2 is a representation of a partial top, perspective view of the support rack 10 from the opposite side of the support rack represented in FIG. 1. The support rack 10 is basically comprised of a first rod 12 at a forward end of the support rack, a second rod 14 at a rearward end of the support rack and an adjustment mechanism structure 16 connecting the first rod 12 to the second rod 14. The first rod 12, second rod 14 and adjustment mechanism structure 16, as well as the other component parts of the support rack 10 to be described, are constructed of materials that provide the component parts with sufficient strength for their intended functioning.

The first rod 12 has a straight length extending between the forward end 18 and the rearward end 22 of the first rod. The first rod 12 has a hollow, rectangular cross section configuration along the entire length of the first rod 12 between the forward end 18 and the rearward end 22. For a point of reference, the length of the first rod 12 from the rearward end 22 to the forward end 18 defines a forward direction relative to the support rack 10. The length of the first rod 12 from the forward end 18 to the rearward end 22 defines a rearward direction relative to the support rack 10. The forward end 18 of the first rod 12 is configured for removable attachment to a vehicle, and more specifically to a receiver tube of a conventional trailer hitch assembly that is attached to the rearward end of a vehicle.

Figure 3:
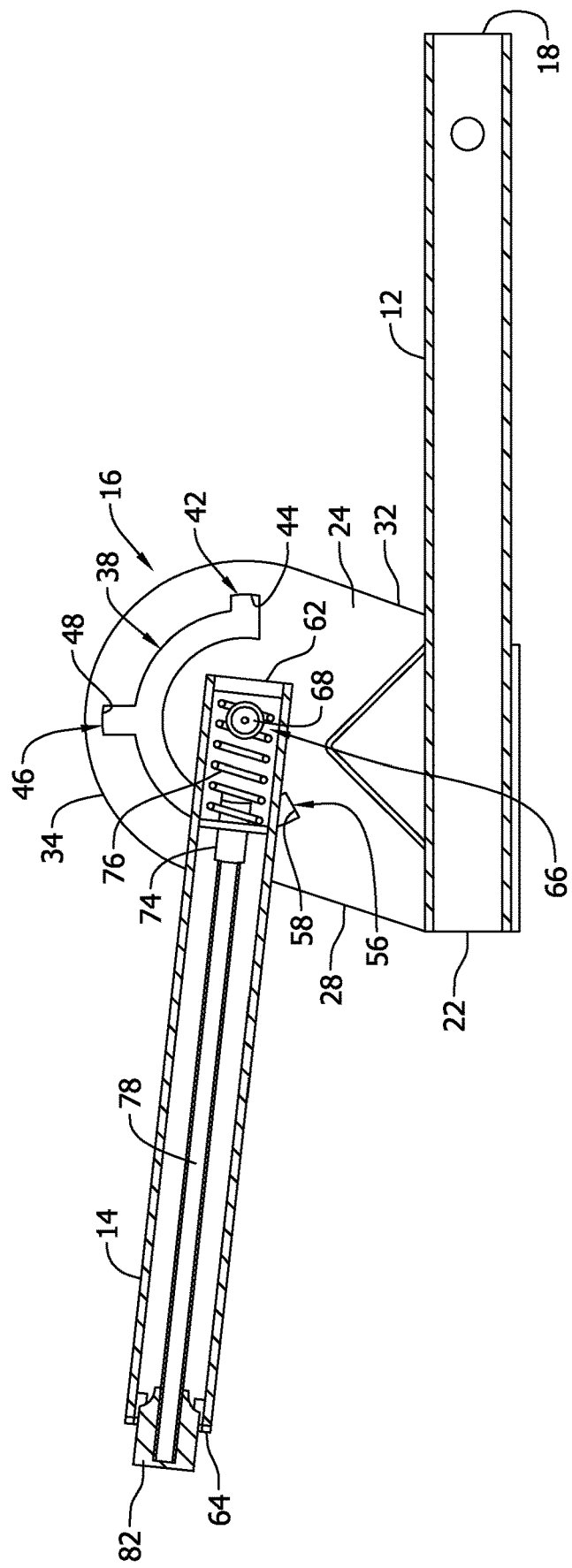
FIG. 3 is a representation of a cross section elevation view of the first rod, the second rod and the adjustment mechanism structure of the support rack from the opposite side of the support rack represented in the FIG. 1.
Figure 4:
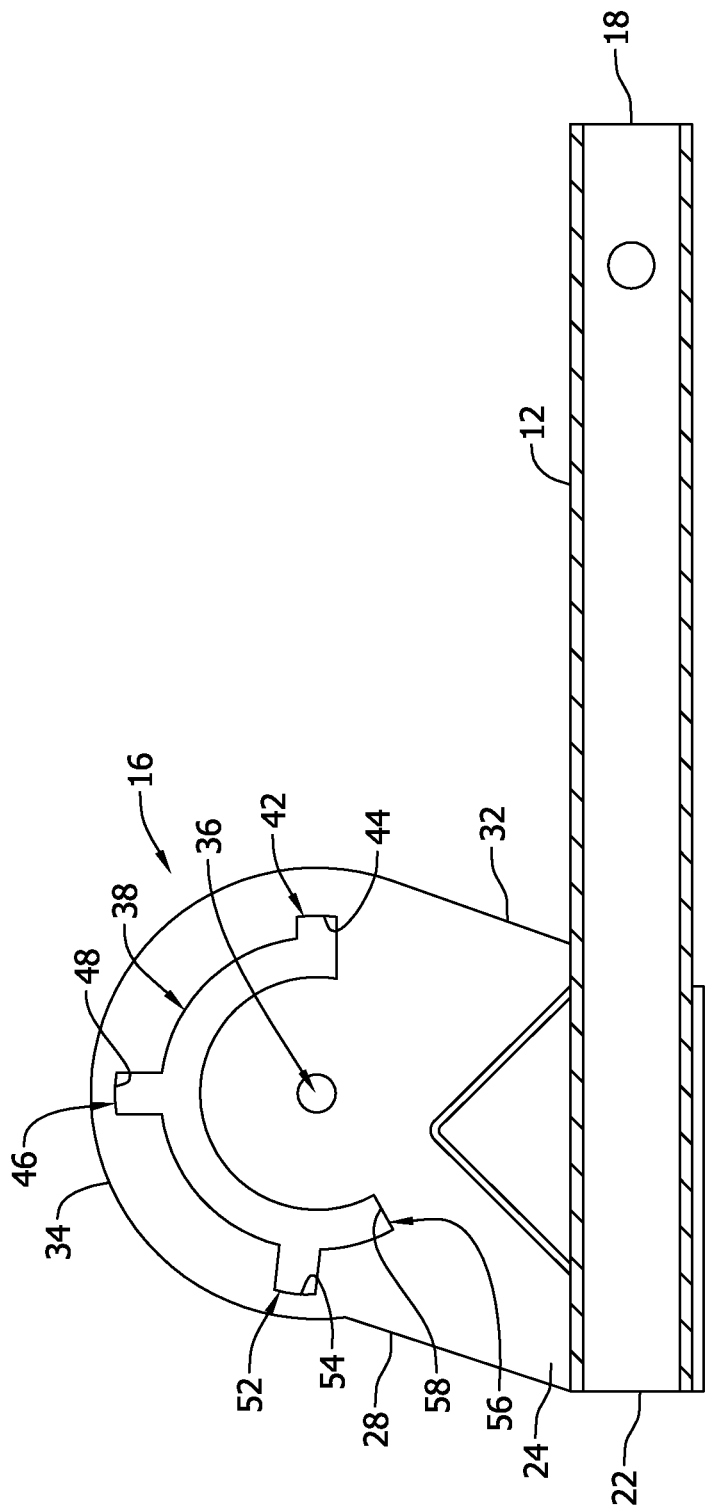
FIG. 4 is a representation of the cross section of the first rod and adjustment structure of FIG. 3 with the second rod removed.

The adjustment mechanism structure 16 is attached to the rearward end 22 of the first rod 12. The structure 16 extends upward from the rearward and 22 of the first rod 12 and it's basically comprised of a pair of plates 24, 26 secured to the opposite sides of the first rod 12 at the rearward end 22 of the first rod. As represented in FIG. 1 and FIG. 2, the plates 24, 26 have substantially identical constructions. Therefore, only a first one of the plates 24 represented in the cross section view of the support rack 10 in FIG. 3 and FIG. 4 is described herein. The second plate 26 has the same construction as the first plate 24 described.

As represented in FIG. 3 and FIG. 4, the plate 24 has opposite forward 28 and rearward 32 edges that are straight, parallel and extend upward from the rearward end 22 of the first rod 12. The edges 28, 32 extend upward and meet at a curved top edge 34 at the top of the plate 24. A pivot hole 36 extends through the plate 24. A curved groove 38 also extends through the plate 24. The curved groove 38 has an arcuate configuration with a radius of curvature that is centered at the pivot hole 36.

A first notch 42 is formed in the right hand end of the groove 38 as represented in FIGS. 3 and 4. The first notch 42 extends from the groove 38 to a first end surface 44 of the first notch 42. The first end surface 44 defines a first stop 44 in the plate 24 of the adjustment structure 16. A second notch 46 is formed in the groove 38 at the top of the groove as represented in FIGS. 3 and 4. The second notch 46 extends from the groove 38 upward to a second end surface 48 of the second notch 46. The second end surface 48 defines a second stop 48 on the plate 24 of the adjustment structure 16. A third notch 52 is formed in the left side of a groove 38 generally opposite the first notch 42 as represented in FIG. 4. The third notch 52 extends from the groove 38 to a third end surface 54 of the third notch 52. The third end surface 54 defines a third stop 54 on the plate 24 of the adjustment structure 16. The groove 38 extends from the third notch 52 downward to an end of the groove that forms a fourth notch 56. As represented in FIG. 4, the fourth notch 56 is positioned downward from and below the third notch 52. The fourth notch 56 defines a fourth end surface 58 of the groove 38 and a fourth stop 58 on the plate 24 of the adjustment structure 16. As represented in FIGS. 3 and 4, the plurality of stops 44, 48, 54, 58 provided on the structure 16 are spatially arranged on the structure at a plurality of positions of the plurality of stops on the structure.

The second rod 14 has a straight length extending between a forward end 62 and an opposite rearward end 64 of the second rod. The second rod 14 also has a hollow, rectangular cross section configuration along the entire length of the second rod between the forward end 62 and the opposite rearward end 64 of the second rod. The forward end 62 of the second rod 14 is connected by a pivot connection 66 to the adjustment mechanism structure 16. The pivot connection 66 is basically provided by a pivot pin 68 that extends through the first plate 24 of the adjustment structure 16, then through the forward end 62 of the second rod 14 and then through the second plate 26 of the adjustment structure 16. The pivot connection 66 provided by the pivot pin 68 enables the second rod 14 to be moved in angular adjusting, pivoting movements about the pivot connection 66 and relative to the adjustment structure 16 and the first rod 12. The second rod 14 is movable between the plurality of positions of the plurality of stops 44, 48, 54, 58 on the adjustment structure 16.

Figure 5:
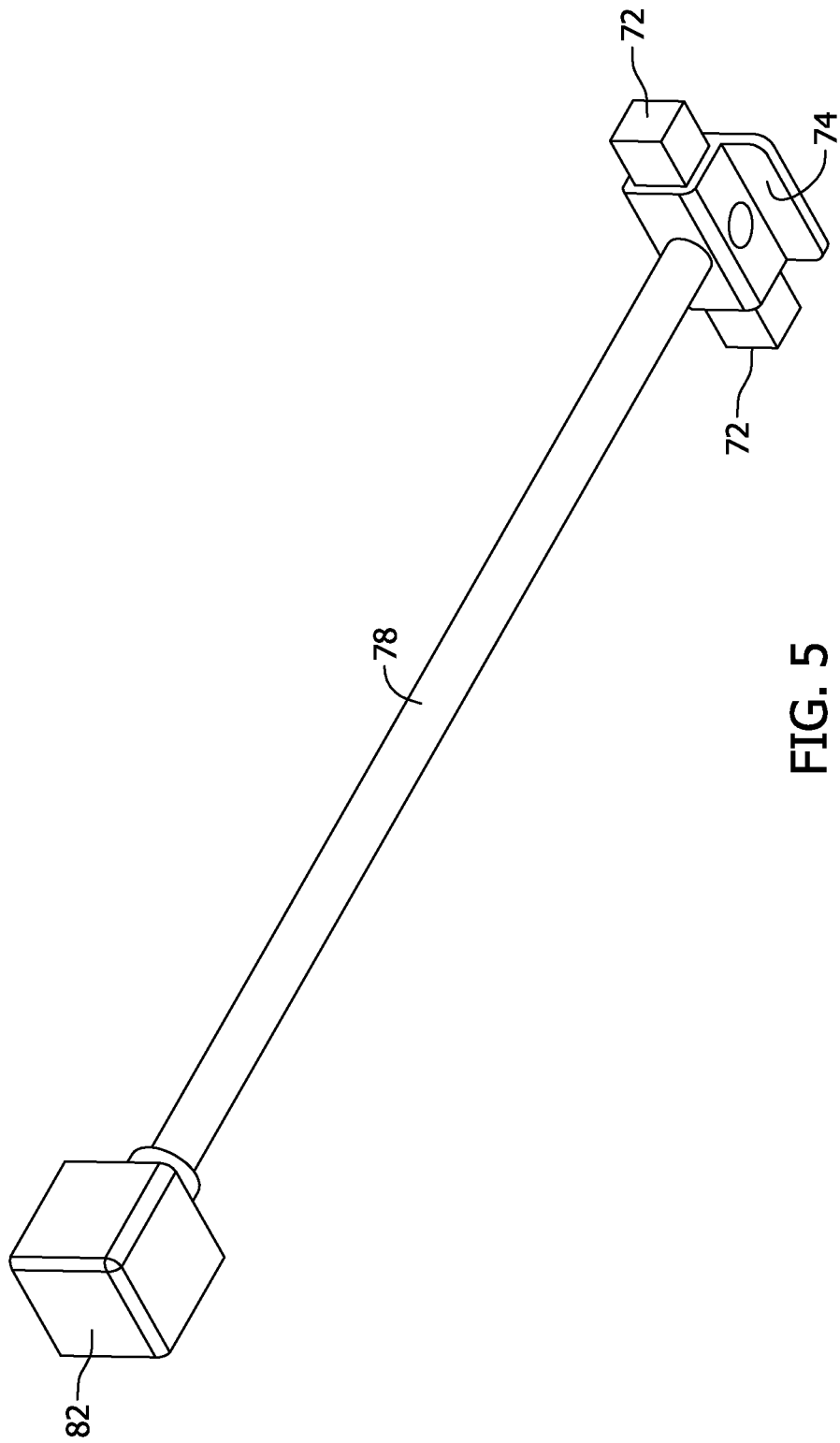
FIG. 5 is a representation of a perspective view of an actuator, shaft, and detent pin inside the second rod of FIG. 3.

A detent is positioned in the interior of the forward end 62 of the second rod 14 for limited reciprocating movements of the detent in the second rod. As represented in FIG. 5, the detent is constructed as a pin 72 extending from a side of a detent base 74. The detent base 74 is configured to slide in reciprocating movements through the interior of the second rod 14. The pin 72 extends from the base 74 and through an elongate opening in a side of the second rod and into the groove 38 in the first plate 24 of the adjustment structure 16. The pin 72 is configured for engaging each stop at each position of the plurality of positions of the plurality of stops 44, 48, 54, 58 on the adjustment structure 16 and retaining the second rod at each position. A spring 76 in the second rod 14 engages against the detent base 74 and biases the base 74 toward the rearward end 64 of the second rod 14. The spring 76 biases the pin 72 into engagement with each stop of the plurality of stops 44, 48, 54, 58 on the adjustment structure 16.

An elongate, straight shaft 78 is connected to the detent base 74 at a forward end of the shaft. The opposite, rearward end of the shaft 78 is connected to an actuator in the form of a manual button 82. The actuator button 82 emerges from the interior of the second rod 14 at the rearward end 64 of the second rod. The spring 76 biases the actuator button 82 to its position extending from the rearward end 64 of the second rod 14. Manually pressing the actuator button 82 into the rearward end 64 of the second rod 14 causes the detent pin 72 to move toward the forward end 62 of the second rod 14 and disengages the pin 72 from any of the stops 44, 48, 54, 58 of the groove 38 in which the detent pin 72 is engaged. The disengagement of the detent pin 72 from the stops 44, 48, 54, 58 enables the pin 72 to slide through the groove 38 and enables the second rod 14 to be manually, angularly moved in pivoting movements on the adjustment structure 16 and relative to the first rod 12.

To make angular adjustments of the object support rack 10, an operator first manually depresses the actuator button 82 into the rearward end 64 of the second rod 14. This disengages the detent pin 72 from any of the notches 42, 46, 52, 56 associated with the respective stops 44, 48, 54, 58 on the adjustment mechanism structure 16. This enables the second rod 14 to freely pivot about the pivot connection 66 provided by the pivot pin 68 to adjusted angular positions of the second rod 14 relative to the first rod 12.

Figure 6:
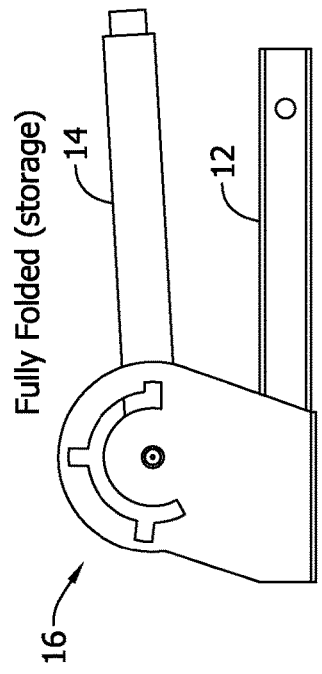
FIG. 6 is a representation of a side elevation view of the support rack in the folded over storage configuration of the support rack.

For example, the second rod 14 can be angularly adjusted relative to the first rod 12 to position the second rod 14 at the first stop 44. At the first stop 44 the detent pin 72 engages in the first notch 42 and stops movement of the second rod 14 on the adjustment structure 16 and relative to the first rod 12. The first stop 44 stops movement of the second rod 14 at a folded over configuration with the second rod 14 positioned extending in the forward direction from the pivot connection 66 on the forward end 62 of the second rod 14 over the first rod 12 to the rearward end 64 of the second rod 14 as represented in FIG. 6. It can be seen from the representation of the support rack 10 in FIG. 6 that the folded over configuration of the second rod 14 over the first rod 12 results in the support rack 10 occupying a reduced area and makes it convenient to store the support rack 10 when the support rack is removed from a vehicle.

Figure 7:
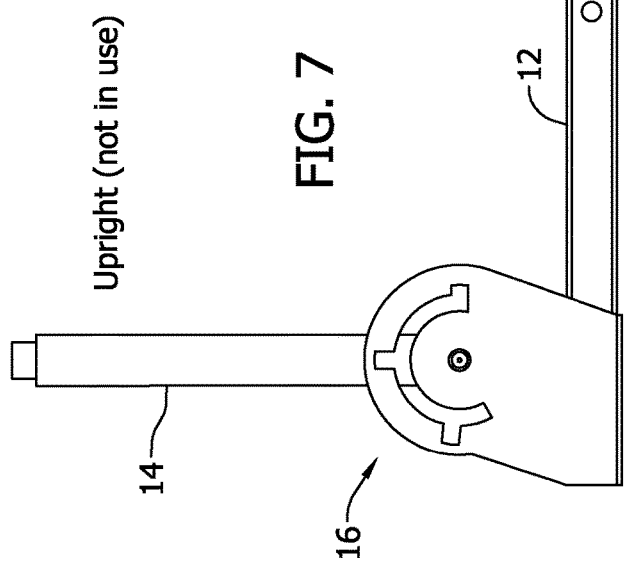
FIG. 7 is a representation of a side elevation view of the support rack in the right angle, not in use configuration of the support rack.

Manually depressing the actuator button 82 and disengaging the detent pin 72 from the first stop 44 enables adjusting movement of the second rod 14 on the adjustment mechanism structure 16 to the second stop 48. At the second stop 48 the actuator button 82 is released and the detent pin 72 engages in the second notch 46 and stops movement of the second rod 14 on the adjustment mechanism structure 16 and relative to the first rod 12. At the second stop 48 the second rod 14 is positioned extending in a right angle orientation relative to the first rod 12 represented in FIG. 7. The right angle orientation of the second rod 14 relative to the first rod 12 reduces the extent to which the support rack 10 extends from the back of a vehicle when the support rack is attached to the vehicle.

Figure 8:
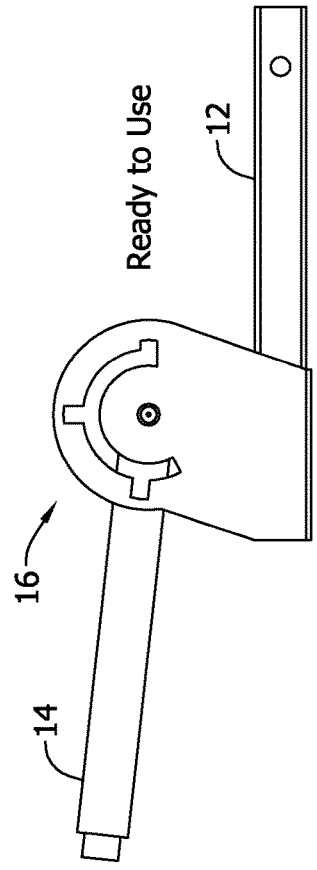
FIG. 8 is a representation of a side elevation view of the support rack in the transport configuration of the support rack.

Manually depressing the actuator button 82 disengages the detent pin 72 from the second notch 46 and enables adjusting movement of the second rod 14 relative to the first rod 12 to the position of the third notch 52. At the third notch 52 the button 82 is released and the detent pin 72 is biased by the spring 76 to engage against the third stop 54 and stop movement of the second rod 14 on the adjustment mechanism structure 16 and relative to the first rod 12. At the third stop 54 the second rod 14 is positioned aligned with the first rod 12 and extending in the rearward direction from the rearward end 22 of the first rod 12 as represented in FIG. 8. In this relative positioning of the first rod 12 and second rod 14 the adjustable bicycle support rack 10 is used in attaching and supporting one or more bicycles on the support rack.

Figure 9:
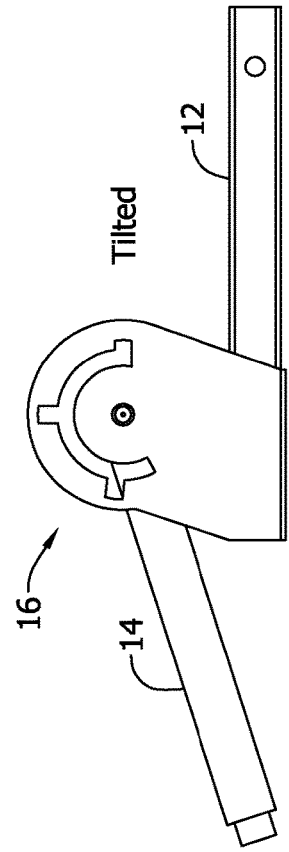
FIG. 9 is a representation of a side elevation view of the support rack in the downward tilted, bike removal configuration of the support rack.

Manually depressing the actuator button 82 disengages the detent pin 74 from the third notch 52 and enables further adjusting movement of the second rod 14 relative to the first rod 12. The second rod 14 can be moved from the third stop 54 to the position of the fourth notch 56 and the fourth stop 58 on the adjustment mechanism structure 16. At the fourth stop 58 the button 82 is released and spring 76 biases the detent pin 72 into the fourth notch 56 and into engagement with the fourth stop 58. This stops movement of the second rod 14 on the adjustment mechanism structure 16 and relative to the first rod 12. The fourth stop 58 stops movement of the second rod 14 with the second rod 14 positioned extending in the rearward direction from the rearward end 22 of the first rod 12 and extending downward from the rearward end of the first rod as represented in FIG. 9. This positions the second rod 14 below the first rod 12 where it is easier to access a trunk, rear hatch or tailgate at the rear of a vehicle to which the support rack 10 is attached.

As represented in FIG. 1, there is at least one object support or bicycle support 84 on the second rod 14, and preferably more than one bicycle support on the second rod 14. Although the object supports are described as bicycle supports, the object supports could support a variety of objects such as camping equipment, boating equipment, sports equipment, etc. As represented in FIG. 1, there is a first bicycle support 84 on the second rod 14 and a second bicycle support 86 on the second rod. The first bicycle support 84 is basically comprised of a first pair of bicycle wheel cradles 88 that are configured for releasable attachment to the wheels of a bicycle to support the bicycle on the first bicycle support 84. The second bicycle support 86 has a second pair of bicycle wheel cradles 92 that are configured for releasable attachment to the wheels of a second bicycle to support the second bicycle on the second bicycle support 86. As represented in FIG. 1, the first pair of wheel cradles 88 are positioned along a first object axis or bicycle axis 94 and the second pair of wheel cradles 92 are positioned along a second object axis or bicycle axis 96. Referring to FIG. 2, it is shown that the first bicycle axis 94 is positioned forward of a pivot axis 98 of the pivot connection 66 provided by the pivot pin 68 and the second bicycle axis 96 is positioned rearward of the pivot axis 98 of the pivot connection 66 provided by the pivot pen 68. This positioning of the first bicycle axis 94 and the second bicycle axis 96 distributes the weight of two bicycles supported on the first bicycle support 84 and the second bicycle support 86 on opposite sides of the pivot pin 68 making it easier to move the second rod 14 supporting the two bicycles relative to the first rod 12. This makes it easier to raise and lower the second rod 14 relative to the first rod 12 when loading and unloading bicycles on the support rack 10.

The positioning of the first bicycle axis 96 forward of the pivot axis 98 is achieved by the unique configuration of the first bicycle support 84. As represented in FIG. 2, the first bicycle support 84 comprises a first bar 102 that is attached to the forward end 62 of the second rod 14 and traverses the second rod 14 in a perpendicular orientation. The first bar 102 has a hollow rectangular cross section configuration such as that of the first rod 12 and second rod 14. The first bar 102 has a center portion 104 that is secured to the second rod 14 spaced rearward of the adjustment structure 16 buy fasteners or other equivalent means. On opposite ends of the center portion 104, the first bar 102 is formed with curved portions or bent portions 106, 106' that bend from the opposite ends of the center portion 104 and then extend in the forward direction on opposite sides of the adjustment structure 16. The bent portions 106, 106' of the first bar 102 extend forward to forward portions 108, 108' of the first bar 102. The forward portions 108, 108' extend forward from the bent portions 106, 106' on opposite sides of the adjustment structure 16 to further bent portions 112, 112' of the first bar 102. The further bent portions 112, 112' curve or bend outwardly from the forward portions 108, 108' to outward end portions 114, 114' of the first bar 102. The outward end portions 114, 114' of the first bar 102 support the first pair of wheel cradles 88. The outward end portions 114, 114' of the first bar 102 are also positioned along the first object axis or first bicycle axis 94. It can be seen that the unique configuration of the first bar 102 described above positions the first pair of wheel cradles 88 on opposite sides of the adjustment structure 16 and positions the first object axis or first bicycle axis 94 forward of the pivot axis 98 of the pivot connection 66 on the adjustment structure 16 as represented in FIG. 2.

As represented in FIGS. 1 and 2, the second bicycle support 86 is comprised of a second bar 116 having a configuration that is a mirror image of the first bar 102. Although only the first bar 102 and second bar 116 are represented in FIGS. 1 and 2, additional bicycle supports comprised of additional bars such as the first bar 102 and second bar 116 can be added to the second rod 14 to support additional bicycles on the support rack 10.

In view of the above, it will be seen that the several objects and advantages of the present invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

The invention claimed is:

1. An angularly adjustable object support rack for a vehicle, the support rack comprising:
   a first rod having a length with a forward end and an opposite rearward end, the forward end being configured for attachment to a vehicle;
   a structure on the rearward end of the first rod, the structure extending upward from the rearward end of the first rod;
   a plurality of stops on the structure, the plurality of stops being spatially positioned on the structure at a plurality of positions of the plurality of stops on the structure;
   a second rod having a length with a forward end and an opposite rearward end;

a pivot connection on the forward end of the second rod attaching the second rod to the structure for pivoting movement of the second rod on the structure about a pivot axis of the pivot connection; and at least one object support on the second rod, the at least one object support being configured for releasable attachment to a separate object to support the separate object on the at least one object support and on the second rod, the at least one object support having an object axis that extends across the at least one object support and across the second rod, the object axis being positioned on an opposite side of the pivot axis from the rearward end of the second rod.

2. The support rack of claim 1, further comprising:

the at least one object support being a first bicycle support, the object axis being a first bicycle axis;

a second bicycle support on the second rod, the second bicycle support having a second bicycle axis, the second bicycle axis being positioned on an opposite side of the pivot axis from the first bicycle axis.

3. The support rack of claim 2, further comprising:

a detent on the second rod, the detent being configured for engaging the stop at each position of the plurality of positions of the plurality of stops on the structure and retaining the second rod at each position.

4. The support rack of claim 1, further comprising:

a plurality of edge surfaces on the structure, each edge surface of the plurality of edge surfaces being configured as a stop of the plurality of stops on the structure.

5. The support rack of claim 4, further comprising:

a pin on the second rod, the pin being configured for engaging with an edge surface of the plurality of edge surfaces on the structure in response to the second rod being moved on the structure to a position of the plurality of positions of the stops on the structure and the pin engaging with an edge surface of the plurality of edge surfaces.

6. The support rack of claim 5, further comprising:

a spring on the second rod, the spring being operatively connected with the pin for biasing the pin into engagement with the edge surface of the plurality of edge surfaces.

7. The support rack of claim 6, further comprising:

an actuator on the rearward end of the second rod, the actuator being operatively connected to the pin and being configured for disengaging the pin from the edge surface in response to manual manipulation of the actuator.

8. The support rack of claim 7, further comprising:

a shaft on the second rod, the shaft being movable along the second rod, the shaft having a forward end operatively connected to the pin and the shaft having a rearward end operatively connected to the actuator.

9. The support rack of claim 5, further comprising:

a groove on the surface;

the plurality of edge surfaces being in the groove; and the pin being in the groove.

10. An angularly adjustable object support rack for a vehicle, the support rack comprising:

a first rod having a length between a forward end and an opposite rearward end of the first rod, the length of the first rod from the forward end to the rearward end of the first rod defining a rearward direction and the length of the first rod from the rearward end to the forward end of the first rod defining a forward direction, the forward end of the first rod being configured for attachment to a vehicle;

a structure on the rearward end of the first rod, the structure extending upward from the rearward end of the first rod;

a plurality of stops on the structure, the plurality of stops being spatially positioned at a plurality of positions of the plurality of stops on the structure;

a second rod having a length between a forward end of the second rod and an opposite rearward end of the second rod;

a connection on the forward end of the second rod attaching the second rod to the structure for movement of the second rod on the structure between the plurality of positions of the plurality of stops on the structure;

the plurality of stops including a first stop that stops movement of the second rod on the structure and relative to the first ride with the second rod position extending in the forward direction from the connection on the forward end of the second rod, over the first rod to the rearward end of the second rod;

the plurality of stops including a second stop that stops movement of the second rod on the structure and relative to the first rod with the second rod positioned extending in a right angle orientation relative to the first rod, a third stop that stops movement of the second rod on the structure and relative to the first rod with the second rod positioned extending in the rearward direction from the rearward end of the first rod, and a fourth stop that stops movement of the second rod on the structure and relative to the first rod with the second rod positioned extending in the rearward direction from the rearward end of the first rod and extending downward from the rearward end of the first rod;

at least one object support on the second rod, the at least one object support being configured for releasable attachment to a separate object to support the separate object on the object support and on the second rod, the at least one object support on the second rod being positioned on the second rod in the forward direction from the connection on the second rod.

11. The support rack of claim 10, further comprising:

a plurality of edge surfaces on the structure, each edge surface of the plurality of edge surfaces being configured as a stop of the plurality of stops on the structure.

12. The support rack of claim 11, further comprising:

a pin on the second rod, the pin being configured for engaging with an edge surface of the plurality of edge surfaces on the structure in response to the second rod being moved on the structure to a position of the plurality of positions of the stops on the structure and the pin engaging with an edge surface of the plurality of edge surfaces.

13. The support rack of claim 12, further comprising:

a spring on the second rod, the spring being operatively connected with the pin and biasing the pin into engagement with the edge surface of the plurality of edge surfaces.

14. The support rack of claim 13, further comprising:

an actuator on the rearward end of the second rod, the actuator being operatively connected to the pin and being configured for disengaging the pin from engagement with an edge surface in response to manual manipulation of the actuator.

15. The support rack of claim 14, further comprising:

a shaft on the second rod, the shaft being movable along the length of the second rod, the shaft having a forward end operatively connected to the pin and the shaft having an opposite rearward end operatively connected to the actuator.

16. The support rack of claim 12, further comprising:

a groove in the structure, the groove having an arcuate configuration;

the plurality of edge surfaces being in the groove; and the pin being in the groove.

17. An angularly adjustable object support rack for a vehicle, the support rack comprising:

a first rod having a length with a forward end and an opposite rearward end, the forward end being configured for attachment to a vehicle;

a structure on the rearward end of the first rod;

a second rod having a length with a forward end and an opposite rearward end;

a pivot connection on the forward end of the second rod attaching the second rod to the structure for a pivoting movement of the second rod on the structure about a pivot axis of the pivot connection; and at least one object support on the second rod, the at least one object support being configured for releasable attachment to a separate object to support the separate object on the at least one object support and on the second rod, the at least one object support having an object axis that extends across the at least one object support and across the second rod, the object axis being positioned on an opposite side of the pivot axis from the rearward end of the second rod.

18. The support rack of claim 17, further comprising:

the at least one object support being a first bicycle support, the object axis being a first bicycle axis; and a second bicycle support on the second rod, the second bicycle support having a second bicycle axis, the second bicycle axis being positioned on an opposite side of the pivot axis from the first bicycle axis.

* * * * *